Patented Dec. 25, 1928.

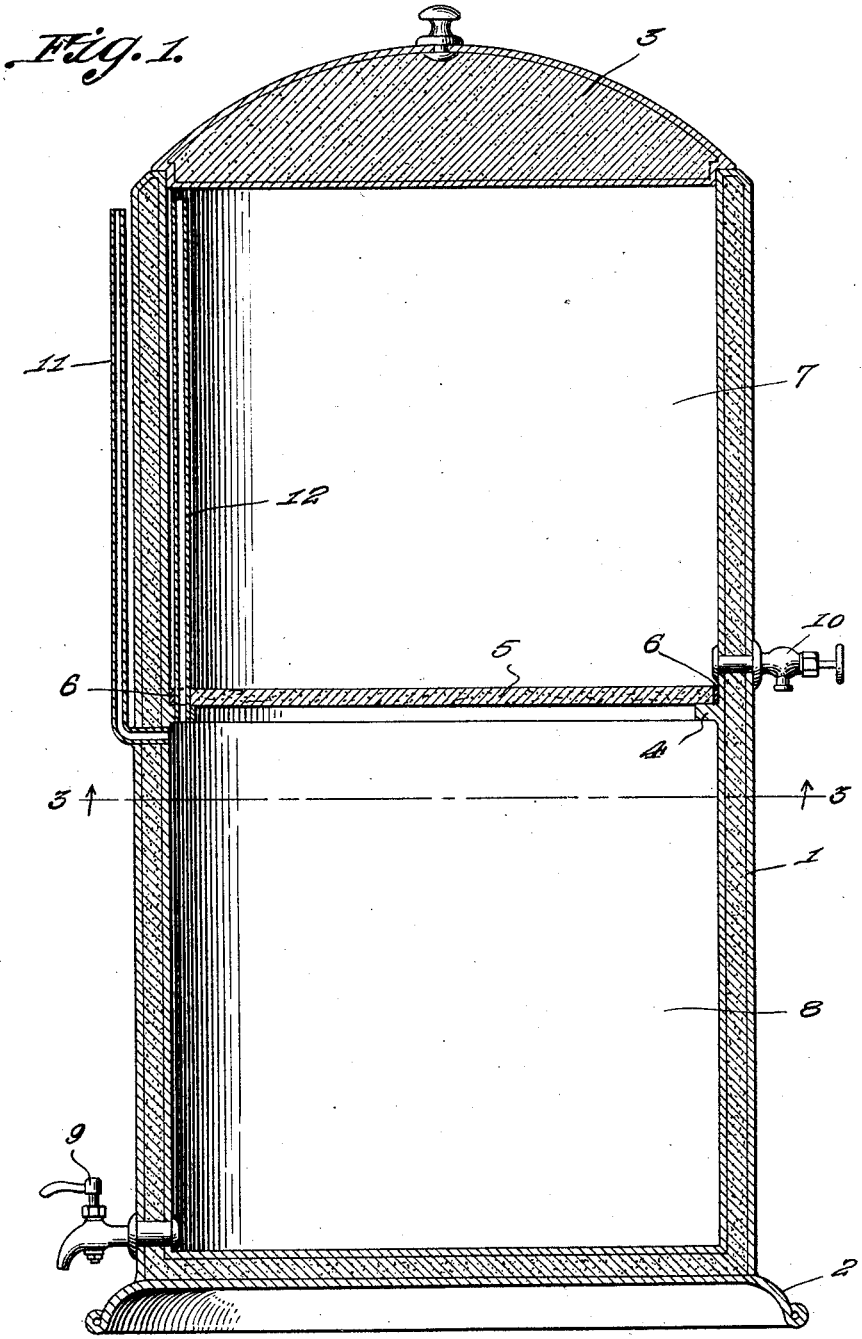

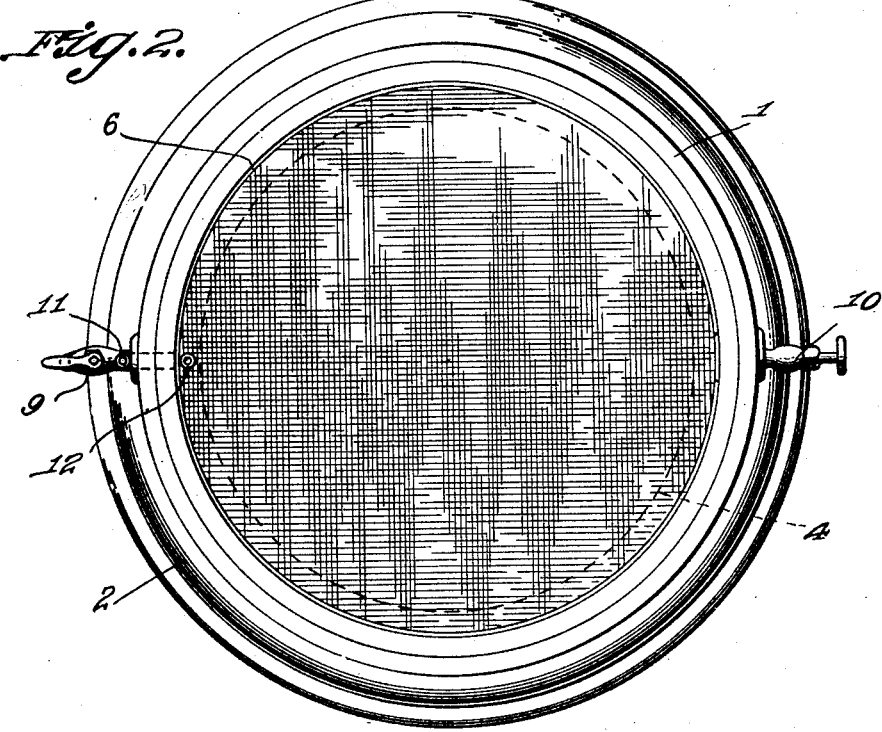
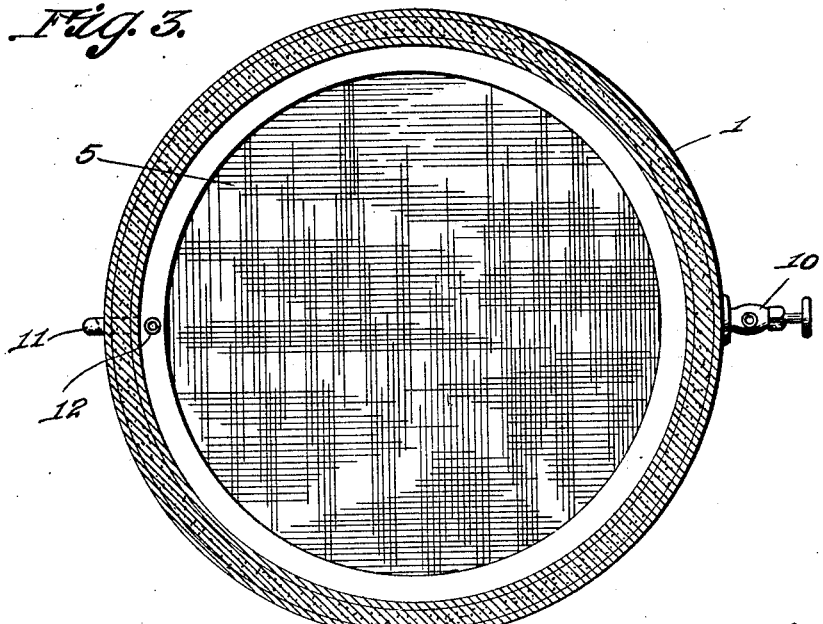

1,696,487

UNITED STATES PATENT OFFICE.

ALBERT E. JERVIS, OF NAPPANEE, INDIANA.

WATER FILTER.

Application filed January 3, 1928. Serial No. 244,256.

My present invention has reference to a filter of that class in which a porous filter disc or block is employed through which water percolates before it can pass into a receptacle from which it is drawn for use, and my object is the provision of a portable water filter that includes a casing or reservoir divided by a filtering disc or block into an upper compartment for the non-filtered water and a lower compartment for the filtered water, the last mentioned compartment being provided with a spigot and the first mentioned compartment being provided with a normally closed drain outlet while means is provided for admitting equalized air in both compartments above the water levels thereof to thereby insure a free filtering of the water from the upper compartment and a free outlet flow of water from the lower compartment.

A further object is the provision of a portable water filter that includes a casing or reservoir having an inwardly directed flange on which rests a filtering disc, together with means for sealing the disc on the flange, the said disc dividing the reservoir into an upper filtering compartment and into a lower compartment into which the filtered water flows and from which the filtered water is drawn through a suitable spigot and in which air equalizing means of a simple but extremely novel nature is employed for directing atmospheric air into the lower compartment above the water level therein and for directing such air from the lower compartment into the upper compartment above the water level therein so that a free and proper filter of the water and a free outflow of the filtered water is insured.

For a full and comprehensive understanding of the improvement reference is to be had to the accompanying drawings which form part of this application and in which:

Figure 1 is an approximately vertical longitudinal sectional view through a filter in accordance with this invention.

Figure 2 is a top plan view thereof with the cover removed.

Figure 3 is a sectional view approximately on the line 3—3 of Figure 1, looking in the direction of the arrows.

The body or reservoir of the improvement is indicated by the numeral 1 in the drawings. This body may be of any desired material, but in the showing of the drawings the same comprises inner and outer connected members between which there is a layer of insulating material. The reservoir is round in plan and has its bottom formed with a base extension 2 and its open top closed by a removable cover 3.

The reservoir at approximately the center thereof, has an inwardly directed ring flange 4, and resting on this ring flange there is a filtering medium preferably in the nature of a porous disc 5. There is a packing 6 of wax or similar material between the periphery of the disc and the inner wall of the reservoir to insure a water tight joint between these elements.

The filtering medium or disc 5 divides the reservoir into an upper filtering compartment 7 and into a lower compartment 8 that receives the filtered water that percolates through the disc 5. The compartment 8, at the bottom thereof, is provided with a faucet 9 through which the filtered water may be drawn and the compartment 7, at the lower portion thereof has attached thereto a drain cock 10.

Let in the compartment 8, directly below the ring flange 4, there is the short and angle end of an upwardly directed pipe 11. Having one end passing through the filtering disc 5 and through the ring flange 4, and securely fixed to the latter there is an upwardly directed pipe 12 that enters the compartment 7 and terminates adjacent to the top thereof. The pipes 11 and 12 provide the air equalizing means for the compartments 7 and 8. Air let through the pipe 11 into the compartment 8 will be partly displaced by the filtered water entering the said compartment, but the air from the said compartment 8 will flow through the pipe 12 into the top of the compartment 7 over the level of the water therein. Thus by the simple arrangement of the pipes 11 and 12 it will be seen that atmospheric air is directed above the level of water in the compartment 8 and from thence into and above the level of the water in the compartment 7 to insure a free filtering of the water from the compartment 7 and the free outlet of the water from the compartment 8.

The construction and the advantages thereof, will, it is thought, be understood and appreciated by those skilled in the art when the foregoing has been carefully read in connection with the accompanying drawings. It is to be understood that the construction as disclosed by the drawings merely illustrates one satisfactory embodiment of the improvement and obviously I do not wish to be restricted to the precise details herein set forth, and consequently hold myself entitled to make such changes therefrom as fairly fall within the scope of what I claim.

Having described the invention, I claim:—

1. A filter comprising a reservoir divided by a filtering medium into an upper filtering compartment and into a lower compartment in which the filtered water is received, and means for introducing atmospheric air into the last mentioned compartment above the water lever therein and for directing air from such compartment into the filtering compartment above the level of the water therein.

2. A water filter comprising a reservoir having an approximately central inwardly directed ring flange, a porous disc comprising a filtering medium resting on the flange, a packing between the disc and the reservoir to establish a water tight joint, a pipe member leading from the top of the lower compartment and terminating above the water level in the upper and filtering compartment and a pipe member of approximately the same length as the first mentioned pipe member arranged parallel therewith and having a lower angle portion which is received in the lower compartment above the level of the water therein.

In testimony whereof I affix my signature.

ALBERT E. JERVIS.